United States Patent
Wang et al.

(10) Patent No.: US 12,346,766 B1
(45) Date of Patent: Jul. 1, 2025

(54) METHODS AND APPARATUS FOR AN AMBIENT INTERNET OF THINGS (IoT) TEMPORARY IDENTIFIER AT A READER

(71) Applicant: InterDigital Patent Holdings, Inc., Wilmington, DE (US)

(72) Inventors: Guanzhou Wang, Brossard (CA); Samir Ferdi, Kirkland (CA); Michael Starsinic, Newtown, PA (US); Alec Brusilovsky, Downingtown, PA (US); Mohamad Kenan Al-Hares, Canterbury (GB); Anuj Sethi, Ottawa (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/666,440

(22) Filed: May 16, 2024

(51) Int. Cl.
*G06K 7/10* (2006.01)
*G16Y 10/40* (2020.01)
*G16Y 40/50* (2020.01)

(52) U.S. Cl.
CPC .......... *G06K 7/10366* (2013.01); *G16Y 10/40* (2020.01); *G16Y 40/50* (2020.01)

(58) Field of Classification Search
CPC ..... G06K 7/10366; G16Y 10/40; G16Y 40/50
See application file for complete search history.

(56) References Cited

U.S. PATENT DOCUMENTS

2024/0406275 A1\* 12/2024 Butt ................. H04W 72/25
2025/0008322 A1\* 1/2025 Wong ................ H04W 12/041

OTHER PUBLICATIONS

OPPO, "New SID: Study on Architecture support of Ambient power-enabled Internet of Things," 3GPP SA#102, SP-231803, Edinburgh, UK (Dec. 11-15, 2023).
Third Generation Partnership Project, "Technical Specification Group Services and System Aspects; System Architecture for the 5G System; Stage 2 (Release 18)," 3GPP TS 23.501 V18.5.0 (Mar. 2024).
Third Generation Partnership Project, "Technical Specification Group Services and System Aspects; Study on Architecture support of Ambient power-enabled Internet of Things (Release 19)," 3GPP TR 23.700-13 V0.2.0 (Mar. 2024).

(Continued)

*Primary Examiner* — Jamara A Franklin
(74) *Attorney, Agent, or Firm* — VOLPE KOENIG

(57) ABSTRACT

A reader device may receive a request including a permanent device identifier (PDI) for an ambient-power-enabled internet of things (AIoT) device. The reader device may generate an encrypted temporary device identifier (ETDI) based on application of an encryption algorithm to the PDI. Further, the reader device may obtain a short-ETDI based on application of a bitmask to the ETDI. Also, the reader device may transmit, over a radio interface, a trigger message including the short-ETDI to the AIoT device. Moreover, the reader device may receive, over the radio interface, a random access (RA) response message including the short-ETDI from the AIoT device. In an example, the request may be an inventory request, and the inventory request may be received from an AIoT function. Further, the request may include an indication that encryption is supported by the AIoT device.

20 Claims, 11 Drawing Sheets

(56) References Cited

OTHER PUBLICATIONS

Third Generation Partnership Project, "Technical Specification Group Services and System Aspects; Study on Architecture support of Ambient power-enabled Internet of Things (Release 19)," 3GPP TR 23.700-13 V0.3.0 (Apr. 2024).

Third Generation Partnership Project, "Technical Specification Group TSG SA; Service requirements for ambient power-enabled IoT; Stage 1 (Release 19)," 3GPP TS 22.369 V19.1.0 (Mar. 2024).

\* cited by examiner

METHODS AND APPARATUS FOR AN AMBIENT INTERNET OF THINGS (IoT) TEMPORARY IDENTIFIER AT A READER

BACKGROUND

An ambient-power-enabled Internet of Things (IoT) (AIoT) device is a kind of IoT device that can harvest energy from the environment, such as wireless radio waves, motion, vibration, piezoelectricity, solar and wind power, and the like. They are either battery-less or have limited energy storage, for example, using a capacitor for energy storage. AIoT devices often find use in Industrial Wireless Sensor Networks where the environment is harsh, for example, extremely high or low temperature, and requires devices to be battery-less, maintenance-free and with long service life. They will also play an important role in Smart Logistics and Smart Warehousing.

Their low-cost, small-form, battery-lessness and durability make them suitable to be attached to huge amounts of goods and facilitate more efficient goods identifying, sorting, tracking and inventory. Accordingly, research has begun to study the system enhancements to support ambient power-enabled IoT device in 3GPP wireless networks.

In an architecture for AIot services, a wireless transmit/receive unit (WTRU) or base station capable of communicating with AIoT devices over a radio interface may be referred to as a reader or reader device. Further, an AIoT function or AIoT controller may handle AIoT services.

SUMMARY

A reader device may receive an request including a permanent device identifier (PDI) for an ambient-power-enabled internet of things (AIoT) device. The reader device may generate an encrypted temporary device identifier (ETDI) based on application of an encryption algorithm to the PDI. Further, the reader device may obtain a short-ETDI based on application of a bitmask to the ETDI. Also, the reader device may transmit, over a radio interface, a trigger message including the short-ETDI to the AIoT device. Moreover, the reader device may receive, over the radio interface, a random access (RA) response message including the short-ETDI from the AIoT device. In an example, the request may be an inventory request. Additionally or alternatively, the inventory request is received from an AIoT function.

Further, the request may include an indication that encryption is supported by the AIoT device. Moreover, generating the ETDI may be further based on the indication that encryption is supported by the AIoT device. Additionally or alternatively, obtaining the short-ETDI may be further based on a determination that the PDI is longer than a maximum message size supported by the radio interface, that the ETDI is longer than the maximum message size supported by the radio interface and that the short-ETDI is shorter than or the same length as the maximum message size supported by the radio interface.

Additionally or alternatively, the reader device may be a wireless transmit/receive unit (WTRU) reader device. Additionally or alternatively, the reader device may be a base station reader device. Additionally or alternatively, the request may include an indication of encryption parameters, and generating the ETDI may be further based on the indication of encryption parameters. Additionally or alternatively, generating the ETDI may be further based a selected random value. Additionally or alternatively, the request may include an application identifier. Additionally or alternatively, the trigger message may further include the bitmask. Additionally or alternatively, the trigger message may further include an algorithm to obtain the short-ETDI.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
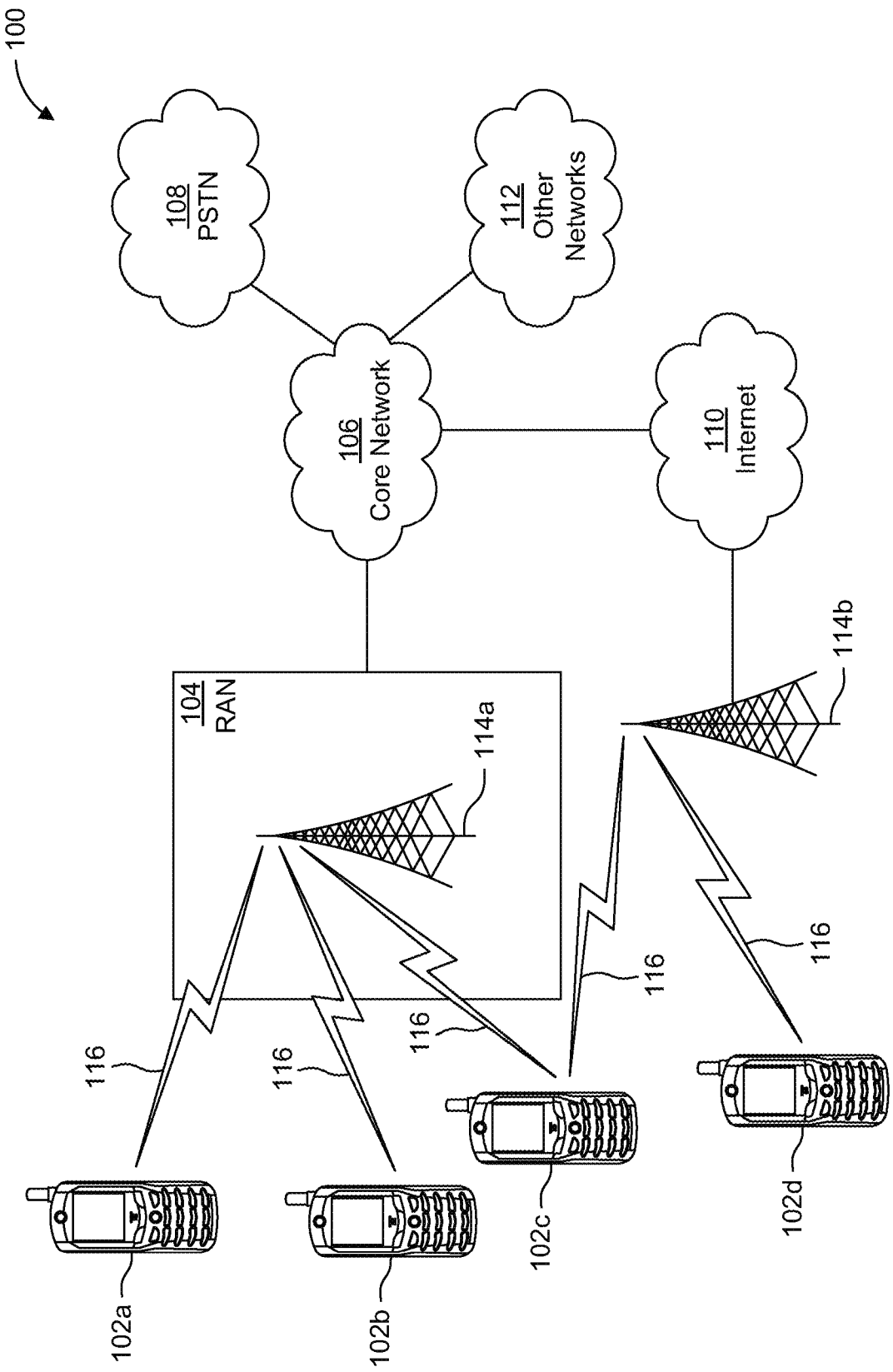
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
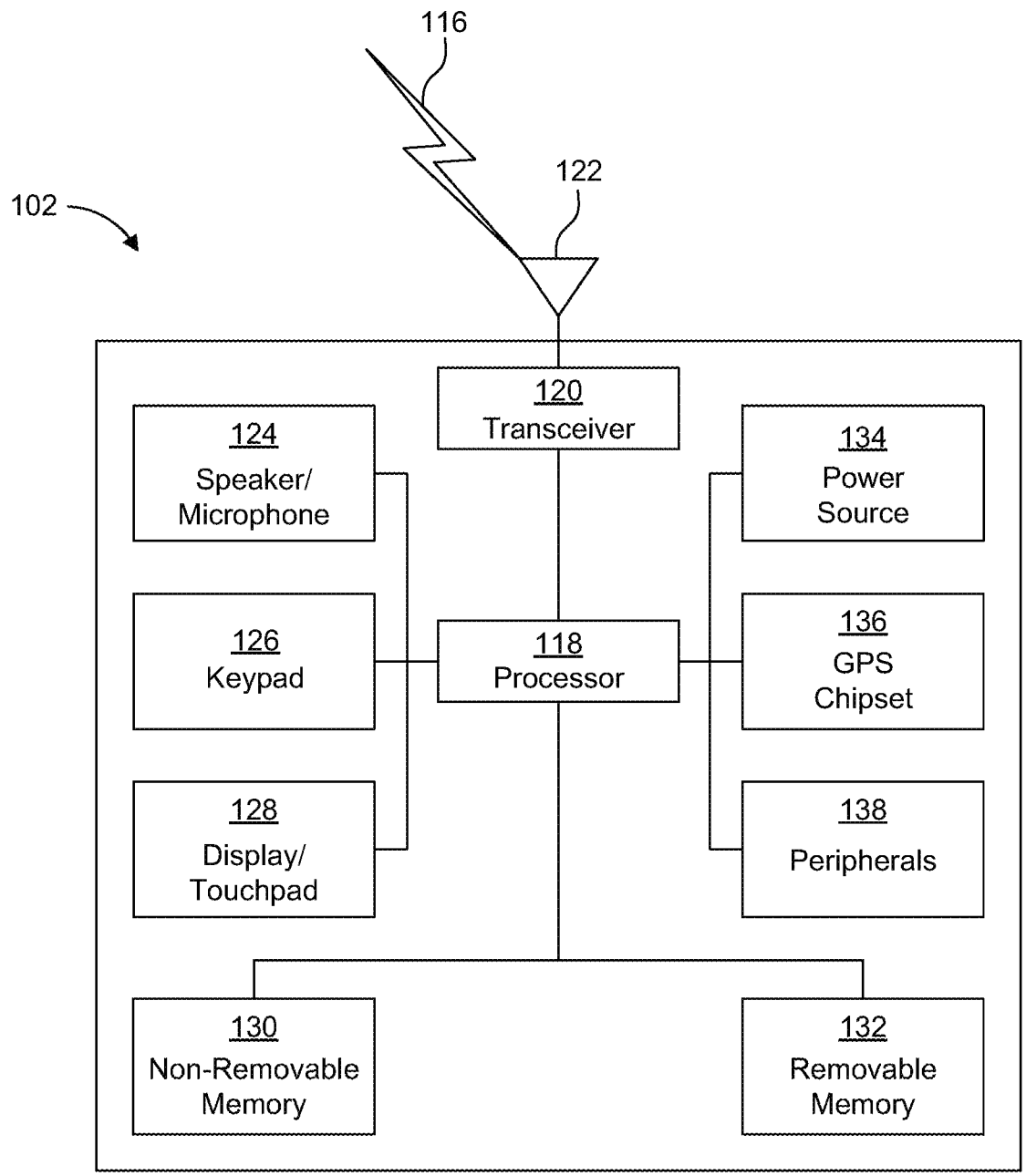
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
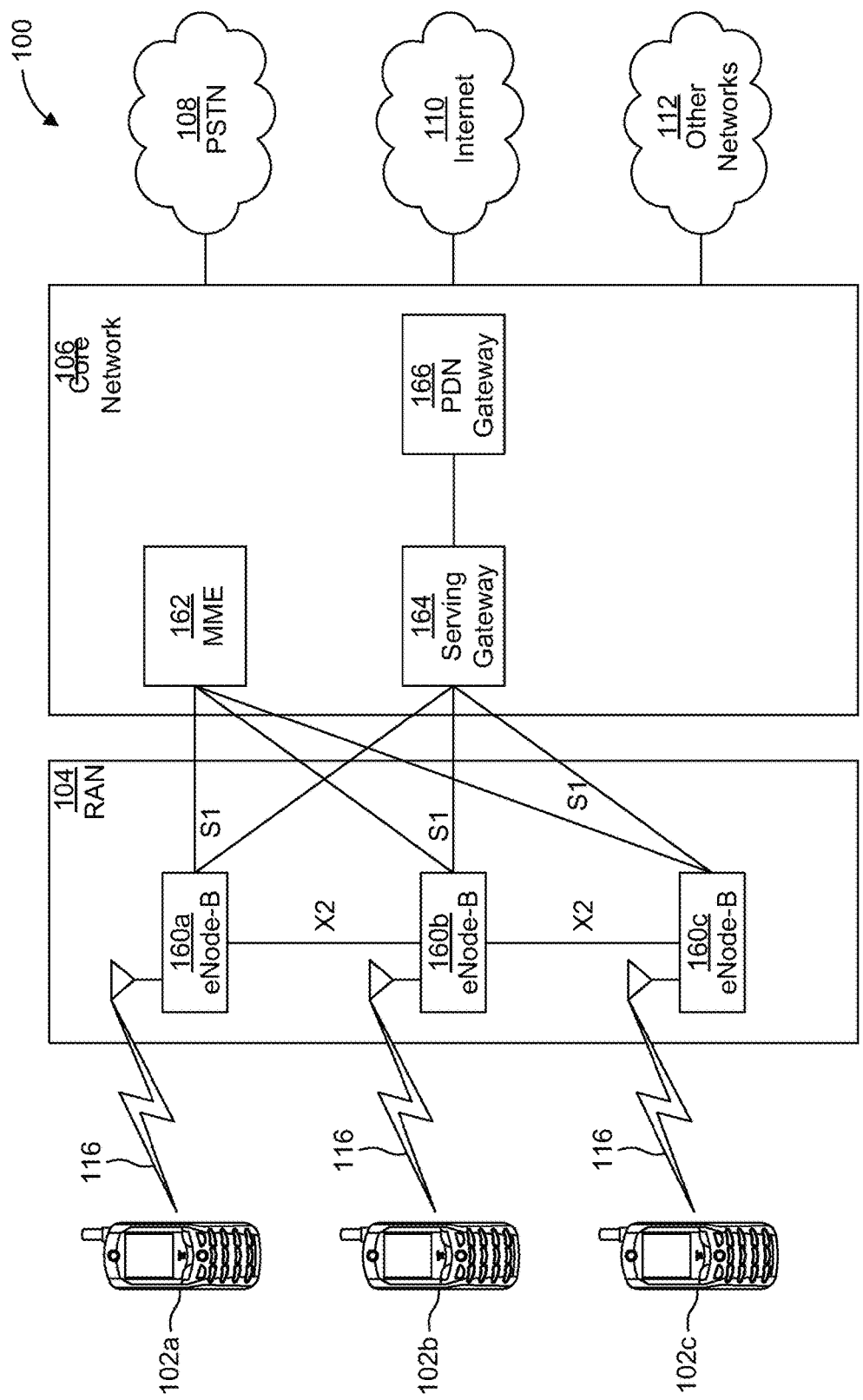
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHZ, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
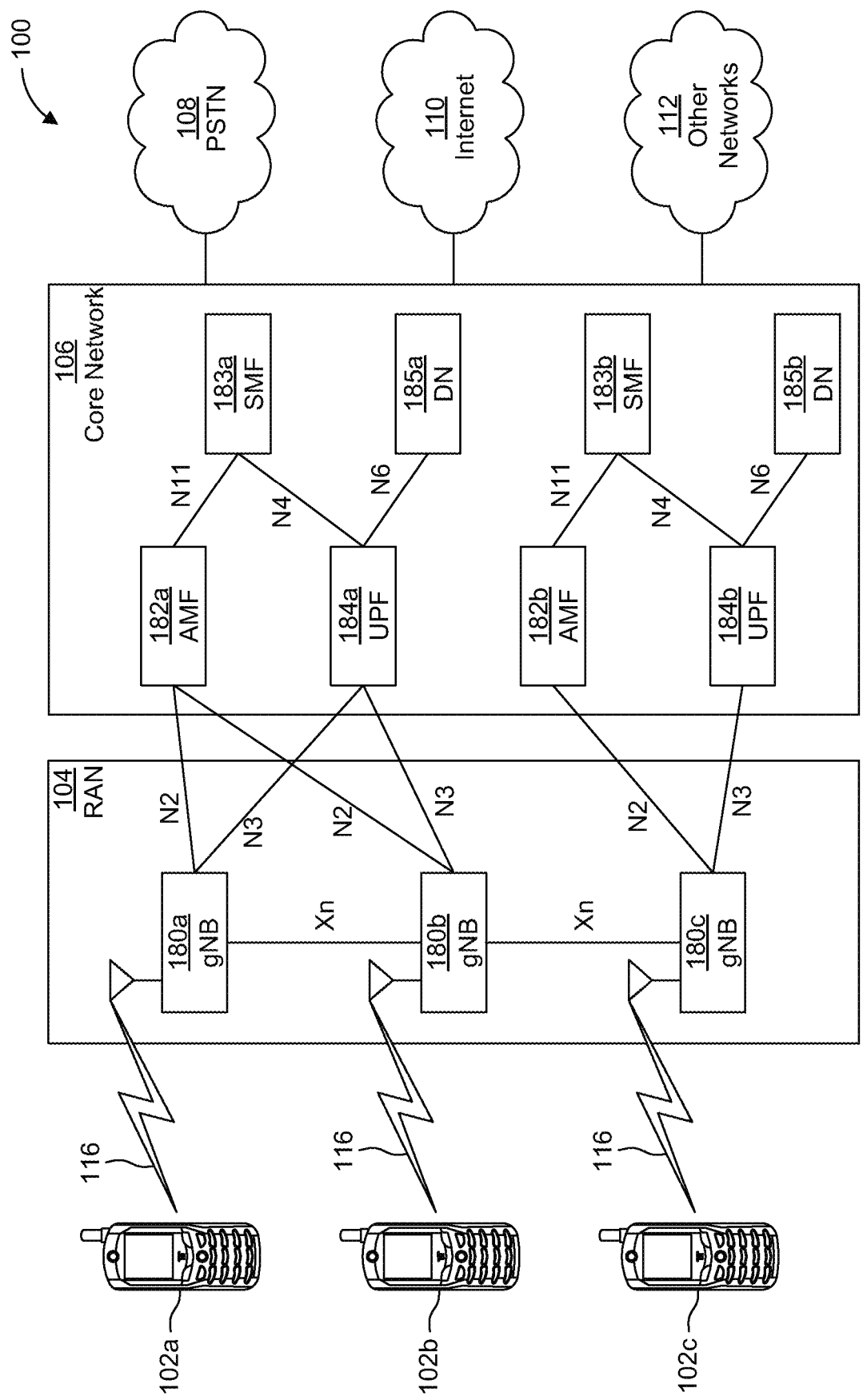
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In an architecture for Ambient-power-enabled Iot (AIoT) services, a UE, a WTRU, gNB, base station or other RAN node capable of communicating with AIoT devices over a radio interface may be referred to as a reader or reader device. In examples, the AIoT services may use Fifth Generation (5G) core network (5GC) architecture modified for AIoT. In the future, AIoT devices and AIoT services may also use sixth-generation (6G) technology.

Further, an AIoT function or AIoT controller may handle AIoT services. The AIoT function may be collocated in other network functions (NFs) such as an AMF. Current research has included two use cases, namely Inventory and Command. Basically, in the Inventory procedure, the AIoT Application Server collects some simple information such as device identification from the AIoT devices through the 5GC and the readers. Further, in the Command procedure, the AIoT Application Server sends some simple command message, for example, Read/Write or Disable, to the AIoT devices through the 5GC and the readers.

Figure 2:
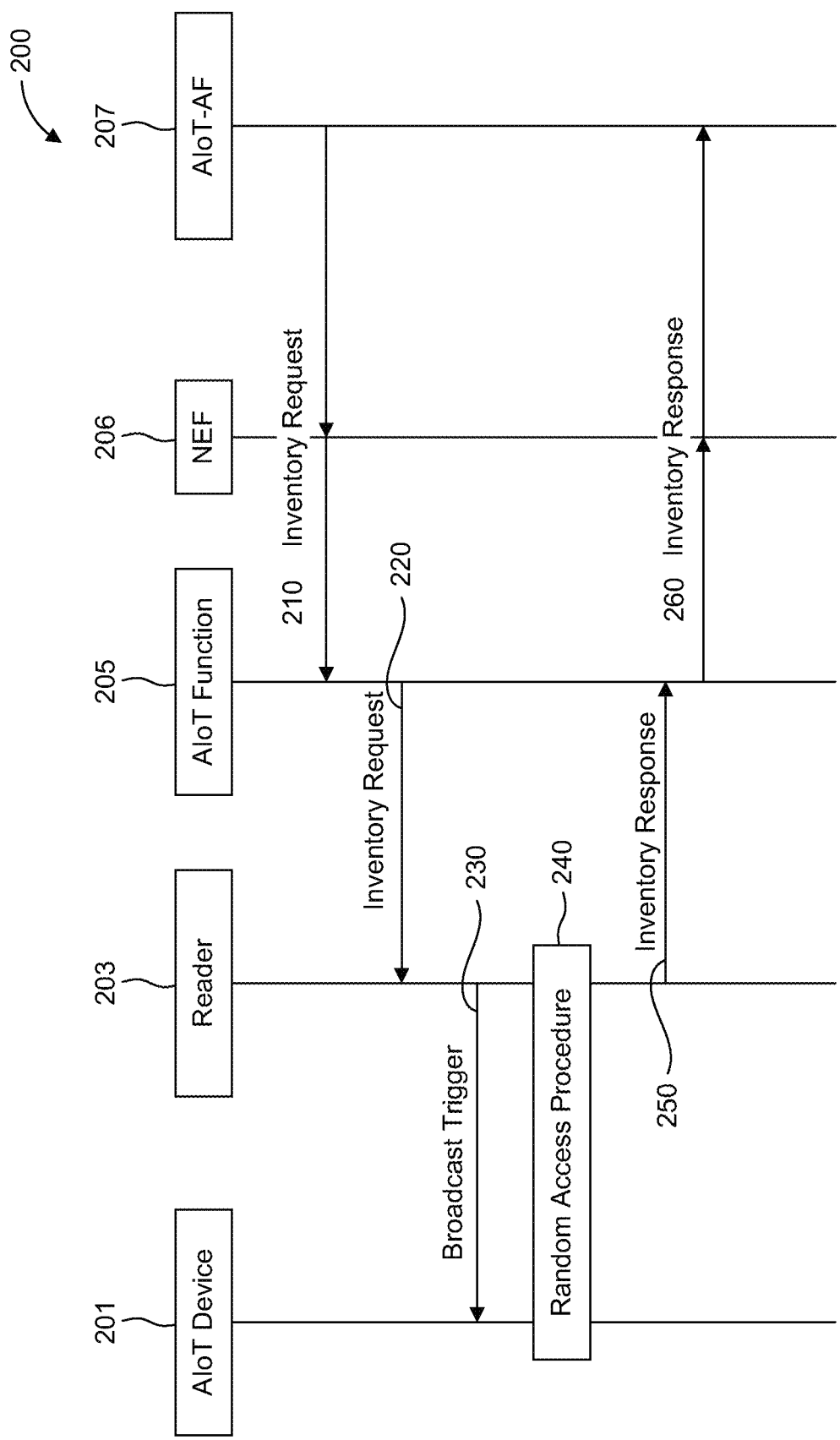
FIG. 2 is a signaling diagram illustrating an example of an ambient-power-enabled Internet of Things (IoT) (AIoT) device inventory service procedure.

FIG. 2 is a signaling diagram illustrating an example of an AIoT device inventory service procedure. As shown in an example in signaling diagram 200, an AIoT service procedure may be used by AIoT devices, such as AIoT device 201. While the AIoT service procedure shown in FIG. 2 is an inventory service procedure, the same or a similar procedure may be used for other service procedures, such as command service procedures.

As shown in FIG. 2, a WTRU or RAN node that is capable of communicating with AIoT devices, such as AIoT device 201, over a radio interface is called a reader, such as reader 203. As also shown in FIG. 2, a network function, AIoT function 205 or AIoT controller, may be introduced to handle AIoT services. If reader 203 is a WTRU, such as a WTRU which is the same as or similar to WTRU 102, then reader 203 may communicate with the AIoT function 205 via a RAN node, such as a gNB. For example, the WTRU reader may communicate with the RAN node over the air interface, such as air interface 116. The RAN node may then communicate with the AIoT function 205 over a wired connection.

If reader 203 is a RAN node, it may be a bases station, such as base station 114a. For example, reader 203 may be a gNB, such as gNB 118a. Further, if reader 203 is a RAN node, it may communicate with the AIoT function 205 over the air interface, over a wired connection, or both. In an example, the RAN node reader may communicate the AIoT function 205 directly over a wired connection. Additionally or alternatively, the RAN node reader may communicate with another RAN node over the air interface, such as air interface 116. The other RAN node may then communicate the AIoT function 205 over a wired connection.

On the network side, the AIoT function 203 may be collocated in other NFs such as the AMF. These functions may be used in the inventory procedure or the command procedure. Basically, in the inventory procedure, the AIoT application server collects some simple information such as device identification from the AIoT devices, such as AIoT device 201, through the 5GC and the readers, such as reader 203. Additionally or alternatively, in the Command procedure, the AIoT application server sends some simple command message, for example, Read/Write or Disable, to the AIoT devices through the 5GC and the readers.

As shown in FIG. 2, the AIoT function 203 may receive an inventory request 210 from an AIoT-AF. Additionally or alternatively, the AIoT function 203 may receive an inventory request 210 via the NEF 206. In an example, the inventory request 210 may originate in an AIoT application function (AF), such as AIoT-AF 207. The inventory request 210 may contain a target device identifier, such as for the AIoT device 201.

Further, the AIoT function 203 selects the reader, such as reader 203, and forwards the inventory request 220 to the selected reader 203. Then the reader 203 broadcasts a trigger message 230 to activate the target device, such as AIoT device 201. The trigger message 230 may contain a target device identifier.

The target AIoT device 201 then initiates a random access (RA) procedure 240 with the reader 203, and the reader 203 obtains the device identifier information through the RA procedure. Further, the reader 203 sends an inventory response 250 message to the AIoT function 205. The AIoT function 205 forwards the inventory response 260 to the AIoT-AF 207, directly or via NEF 206.

Current research faces the question of how to identify an AIoT device or a group of AIoT devices. In current research, it is assumed that each AIoT device has a globally unique identifier, or permanent device identifier (PDI), and AIoT devices are able to store this identifier in their non-volatile memory. The PDI may contain information such as the owner identification, the AIoT application identifier, and the like. The format of PDI may be a new format designed by 3GPP or it may use a certain existing standard such as electronic product code (EPC) or radio frequency identification (RFID) identifiers.

When a reader broadcasts a trigger for an AIoT device, the reader needs to broadcast a device identifier that can pinpoint the target AIoT device. The reader may use the AIoT device's PDI which may be the PDI that was received in the request, such as an inventory request, from the AIoT-AF. However, including the PDI in the broadcast trigger or the following RA procedure may have some disadvantages or problems, as explained below.

For example, the message size that can be accommodated by the radio interface may be insufficient for the lengthy PDI. Also, using unprotected PDIs over a radio interface may present itself as a security vulnerability that may be exploited as a privacy attack.

Therefore, a certain form, or format, of a temporary identifier may be used over a radio interface between a Reader and AIoT devices to address these disadvantages or problems. Accordingly, to enable the efficient use of a sufficiently short and temporary identifier for AIoT devices, new methods, apparatus or solutions are needed to address the following aspects.

An aspect to address includes how a reader determines the form of the device identifier to be used, for example, in a broadcast trigger message. Additionally or alternatively, if a temporary identifier is received through the AIoT device RA procedure, an aspect to address includes how a reader associates the temporary identifier with a permanent device identifier or an AIoT application.

As AIoT devices may not support typical access stratum procedures, for example, radio resource control (RRC) procedures, after the random access procedure, the information that a reader can obtain from AIoT devices may be limited to what the AIoT device sends in the random access procedure. The information that the AIoT device can send in a Random Access procedure may only be device identifier information. The AIoT application, for example, an inventory application, may rely on the reader to add more information to the AIoT application's response before it is sent to an AIoT-AF. An applicable solution includes how a reader can provide complementary information to the AIoT application servers.

Embodiments and examples provided herein include the reader determining the type of device identifier, based on network or application provided configuration, and generating the device temporary identifier for communicating with the AIoT device over radio interface. The reader also associates the received device response to the AIoT device and its application based on the temporary device identifier in the response.

Further, embodiments and examples provided herein include the reader complementing the received device response with additional content based on network or application provided configuration of required content and format, and constructing the inventory report. Further, the reader sends the inventory report to the application server via the 5GC.

In an example, a reader may receive a request from the AIoT-application server (AS), the AIoT-AF, or both, via the 5GC. The reader may be a WTRU reader or a RAN-node reader. The request may include a PDI and information that may assist the reader to select or generate a temporary device identifier, for an AIoT device, to be used over a radio interface.

Further, the reader may determine or may select the type of device identifier to be used over the radio interface based on a few factors. In examples, the factors may include one or more of whether the device supports an encrypted identifier, a concealed identifier, or both; the maximum message size supported by the radio interface; and the like. Also, the reader may send the broadcast trigger message, to the AIoT device, over the radio interface and include the selected or generated temporary device identifier in the trigger message.

In addition, the reader may receive, from the AIoT device, the device response message that include the device temporary identifier. Moreover, the reader may identify the AIoT device and associated AIoT application based on the received device temporary identifier.

In another example, a reader may receive a configuration that defines the required content, the required format, or both, of the inventory report for a specific AIoT application. The reader may be a WTRU reader or a RAN-node reader. The reader may receive a device response message and construct a reader-complemented inventory report based on the configuration of the required content, the required format, or both. Moreover, the reader may send the reader-complemented inventory report to the AIoT-AS, the AIoT-AF, or both.

Embodiments and examples provided herein include AIoT device temporary identifier handling at a reader. To conceal the AIoT device identifier, and to fit the maximum message size supported by radio channels, a reader and AIoT devices may use temporary device identifiers to communicate with each other over the radio interface. The generation of the temporary identifier may use some methods, for example, by applying a bitmask to the PDI that gives a part of the PDI, such as, the last 8 bits of the PDI, as the temporary identifier. Additionally or alternatively, the temporary identifier may employ more sophisticated methods that use cryptographic algorithms to derive a shorter PDI while preserving PDI uniqueness. For example, hash functions or symmetric-encryption-based algorithms may be used.

Therefore, various types of device identifiers, such one or more of the following, may be used by a reader and AIoT devices: a PDI, a simple temporary device identifier (STDI), a concealed or encrypted temporary device identifier (ETDI), a shortened encrypted temporary device identifier (short-ETDI), or a pseudonym identifier (PSDI). The STDI may be part of the PDI. For example, the STDI may be the last 6 bits of the PDI, in an example. In another example, the STDI may be the first 6 bits of the PDI.

The ETDI may be generated from the PDI using an encryption or other type of randomization algorithm. For example, the ETDI may be generated using hashing or scrambling of the PDI.

The short-ETDI may be part of the ETDI. For example, the short-ETDI may be the last 8 bits of the ETDI, in an example. In another example, the short-ETDI may be the first 8 bits of the PDI. Further, the PSDI may be part of a set of one or more pseudonym identifiers or aliases associated with the AIoT device.

Examples provided herein include an AIoT reader determining what form of identifier, for example, a PDI or a temporary identifier, is to be used for communicating with one or a group of AIoT devices. The AIoT reader may be a WTRU reader or a RAN-node reader capable of communicating with AIoT devices over a radio interface.

Further, the AIoT reader may generate a temporary identifier for communicating with one or a group of AIoT devices. Moreover, the AIoT reader may identify an AIoT device, an AIoT application associated with an AIoT device, or both, based on an identifier, such as the temporary identifier, received from the AIoT device.

An AIoT reader, when receiving a request, such as an inventory request, from an AIoT application server or AF, may receive the following information in the request. The AIoT reader may receive information, such as a PDI, in the request that identifies the target AIoT device. Further, the AIoT reader may receive information in the request that indicates whether the PDI is allowed to be sent in clear text over a radio interface. Also, the AIoT reader may receive information in the request that includes an indication of whether the target device supports an encrypted temporary identifier, such as supporting, for example, a generation of a temporary identifier using cryptographic methods.

In addition, the AIoT reader may receive information in the request that includes an identifier of the encryption algorithm that is used for generating temporary identifiers. Further, the AIoT reader may receive, in the request, information needed by the encryption algorithm. for generating temporary identifiers. Such information may include keys, counters, and the like. Moreover, the AIoT reader may receive information in the request that includes a bitmask for identifying the AIoT function, such as those in examples detailed elsewhere herein.

Additionally or alternatively, if the AIoT reader is a WTRU, the AIoT reader may obtain the above information during a reader registration or authorization procedure during which the WTRU is authorized by the 5GC and AIoT AF to operate as a reader for one or multiple AIoT applications. Additionally or alternatively, a reader may be preconfigured with the above information per AIoT application.

Examples provided herein include a selection of the type of device identifier. When a reader receives a request, such, for example, an inventory request, the reader may determine which form of device identifier, type of device identifier, or both, which may be used for communicating with the target device over a radio interface. For example, the reader may choose one of the device identifier forms described above.

A reader may choose the form of device identifier, type of device identifier, or both, based on one or more of the following information. The reader may choose based on whether the target device supports an encrypted temporary identifier. This information may be provided by the AIoT application server or AF as described above.

The reader may choose based on whether clear-text PDI is allowed over a radio interface. This information may be provided by the AIoT application server or AF as described above or preconfigured in the reader.

Also, the reader may choose based on the maximum message size or channel capacity that can be accommodated by the radio interface between the reader and the AIoT device. This information may be preconfigured in the reader. There may be a different maximum message size for DL transmission and for UL transmission.

Moreover, reader may choose the form of device identifier, type of device identifier, or both, based on whether the target device supports pseudonym based inventory. The set of pseudonym identifiers may be pre-configured in the AIoT device, or communicated to the reader to by the AIoT application server or AF.

In an example, when a reader receives an AIoT request, such as an AIoT inventory request, the request may indicate that clear-text PDI is allowed for the radio interface, and the size of PDI can be accommodated by the radio interface. Accordingly, the Reader may choose to use the PDI over the radio interface.

In another example, when a reader receives an AIoT request, such as an AIoT inventory request, the request may indicate that clear-text PDI is not allowed for the radio interface. The request may also indicate that the target device does not support an encrypted temporary identifier, or that there is no indication that the target device supports encrypted temporary identifier. In this case, the Reader may choose to use an STDI. To generate the STDI, the reader may take into consideration the maximum message size supported by the radio interface and the needed uniqueness or rareness of the resulting identifier. For example, if the radio interface supports 16 bits of information in DL transmission, the reader may determine to use an STDI of length that is less than 16 bits, such as, for example, 12 bits. For example, the reader may apply a bitmask operation over the PDI to obtain the last 12 bits of the PDI, and use those last 12 bits as the STDI to be used over the radio interface.

For another example, when a reader receives an AIoT request, such as an AIoT inventory request, the request may indicate that clear-text PDI is not allowed for the radio interface, and it may indicate that the target device supports an encrypted temporary identifier. The request may also indicate the encryption algorithm supported by the target device and additional parameters needed by the encryption algorithm, for example, keys, counter values, and the like. If the length or size of the generated ETDI can be accommodated by the radio interface, the reader may choose to use the ETDI. Otherwise, the reader may choose to use a short-ETDI, for example, by applying a bitmask operation to the generated ETDI and obtaining the last few bits of the ETDI.

As another example, when a reader receives an AIoT request, such as an AIoT inventory request, the request may directly include a temporary device identifier that has been generated at the AIoT AS or AF. In this case, the reader may directly use the AS-generated temporary identifier if the size of the temporary identifier can be supported by the radio interface or shortened temporary device identifier by applying a bitmask operation to the AS-generated temporary identifier to obtain the last few bits of the temporary identifier.

In an example using PSDI, the reader receives an AIoT request, such as an AIoT inventory request, and the request may include a set of PSDIs that the reader may select from in order to transmit over the radio interface. The reader may select the PSDI according to different algorithms or protocols, such as random selection, based on a predetermined sequence. The AIoT device responds on the condition of detecting a PSDI matching one of its configured PSDIs according to the chosen algorithm. The algorithm or protocol for PSDI selection may be indicated to the reader by the AIoT function. If sequential selection is used, the AIoT function may provide the reader with an inventory sequence number, such as, a number synchronized with the AIoT device, where the inventory sequence number is incremented by the AIoT device and incremented by the AIoT function, the reader, or both, during an inventory transaction.

After the reader has chosen the type of device identifier, the reader may broadcast the device identifier over the radio interface, to trigger the target device to respond. The reader may, in addition, broadcast the following information together with the device identifier.

The reader may broadcast whether the encrypted temporary identifier or clear-text identifier is used. Also, the reader may broadcast whether a shortened identifier is used. Moreover, the reader may broadcast a bitmask used for generating the shortened identifier.

Rather than broadcasting an indication of the format of the device identifier, different radio resources may be used to broadcast each type of identifier. For example, one system information block may be used to broadcast a first type of identifier and a second system information block may be used to broadcast a second type of identifier. Additionally or alternatively, certain ranges of identifier values may be used for a first type of identifier format and a second range of identifier values may be used for a second type of identifier format.

Figure 3:
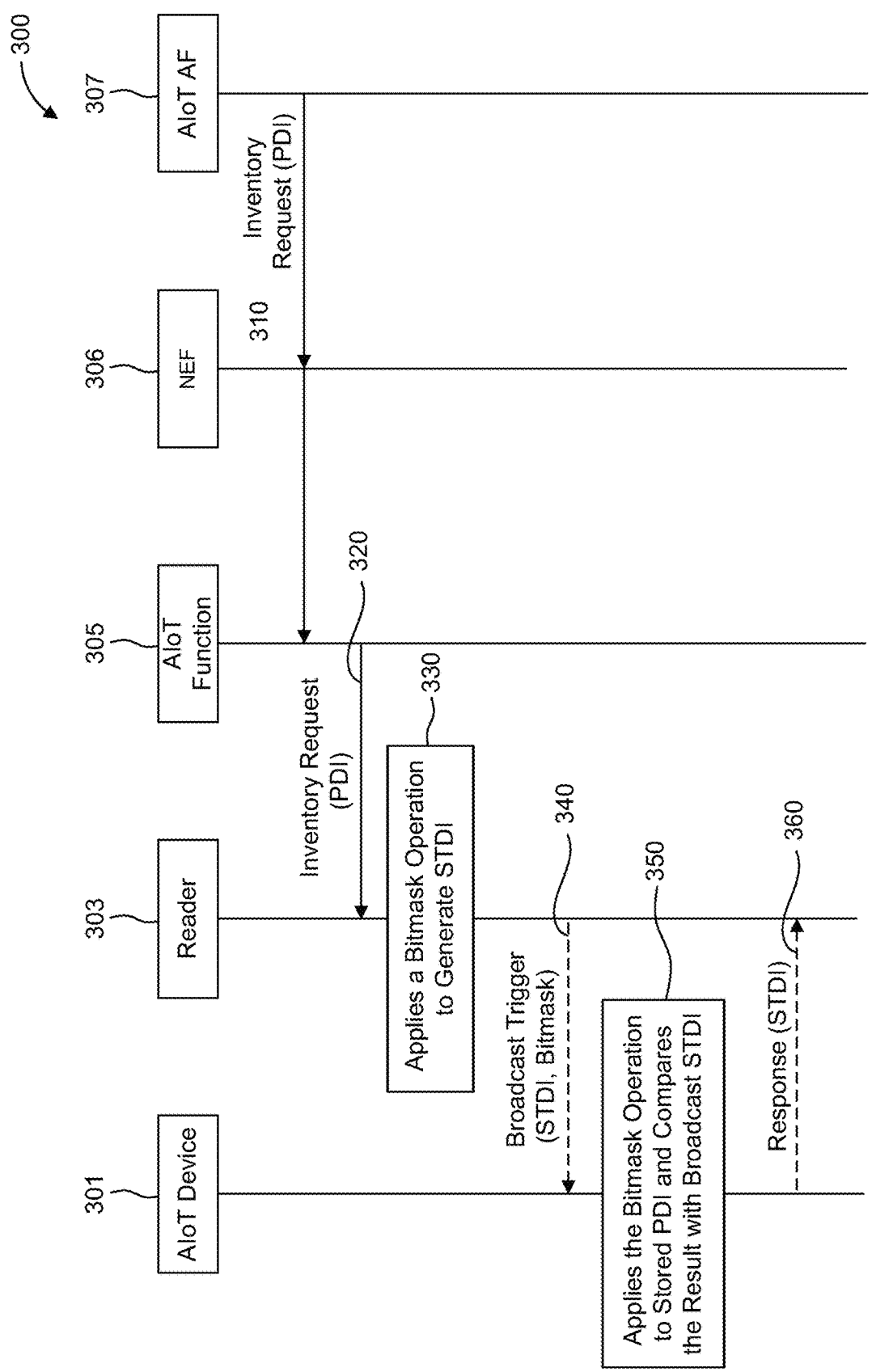
FIG. 3 is a signaling diagram illustrating an example of a reader generating a simple temporary device identifier (STDI) for communicating with an AIoT device.

FIG. 3 is a signaling diagram illustrating an example of a reader generating an STDI for communicating with an AIoT device. As shown in an example in signaling diagram 300, an AIoT AF 307 may send a request 310, such as an inventory request, to the 5GC. Additionally or alternatively, the request may be a communication request. The request 310 may include a target device PDI. Additionally or alternatively, the request 310 may also include the application identifier and a transaction number that identifies the request. The request 310 may be received by NEF 306, and may be forwarded by the NEF 306 to the AIoT function 305.

Then, the AIoT function 305 may forward the inventory request 320 to a reader 303 that can communicate with AIoT device 301. In an example, the reader 303 may be a WTRU reader. Additionally or alternatively, the reader 303 may be a RAN node reader, such as a base station reader. The inventory request 320 may include the PDI.

The reader 303 may compare the size of the PDI that is received in the request 320 with the preconfigured maximum message size supported by the radio interface. The reader 303 may determine that an STDI should be used. In an example, the reader may determine that the STDI should be used instead of the PDI because the PDI is larger than the maximum message size supported by the radio interface.

The reader 303 may then choose a bitmask and apply it to the PDI to generate an STDI 330 that can fit the radio interface message. In an example, the bitmask may be an eight digit bitmask. Also, the reader 303 may store the PDI, bitmask and generated STDI along with the request information, such as, for example, an application identifier and transaction number that identifies the request, in a local context.

Additionally or alternatively, the request message 320 that was received by the reader 303 may indicate the maximum message size supported by the radio interface of the AIoT device 301. In this way, the reader may compare the PDI with the maximum message size supported by the radio interface without a preconfigured maximum message size.

Further, the reader 303 may broadcast a trigger message 340 over the radio interface and include the generated STDI in the trigger message. Additionally or alternatively, the trigger message 340 may include the bitmask, in an example.

In addition, the AIoT device 301 may detect and decode the trigger message, and obtain the STDI and the bitmask. The AIoT device 301 may apply the bitmask to its stored PDI and compare the result with the received STDI 350, which had been broadcast to the AIoT device 301. If the result matches the received STDI, the AIoT device 301 recognizes that the broadcast trigger has targeted the AIoT device 301. Accordingly, the AIoT device 301 will initiate a response. Otherwise, it may ignore the trigger.

Additionally or alternatively, the bitmask may be preconfigured in the AIoT device 301. For example, the bitmask may be preconfigured based on the capabilities of the AIoT device 301. In an example, the capabilities may include how many bits the AIoT device 301 is capable of receiving in a single message.

Moreover, the AIoT device 301 may initiate the random access procedure in response to receiving the trigger message 340. Accordingly, the AIoT device 301 may include the STDI in the RA response message 360.

Additionally or alternatively, the AIoT device 301 may include the PDI of the AIoT device 301 when it initiates the random access procedure. In other words, the AIoT device 301 may receive the STDI and respond with the PDI. The advantage of this approach is the AIoT Device would receive a shortened value, increasing wireless communications efficiency. Responding with the PDI, in other words, the longer value, would account for a scenario where multiple PDIs map to the same STDI. In other words, multiple devices may respond to the same STDI but each device would respond with a different PDI.

Figure 4:
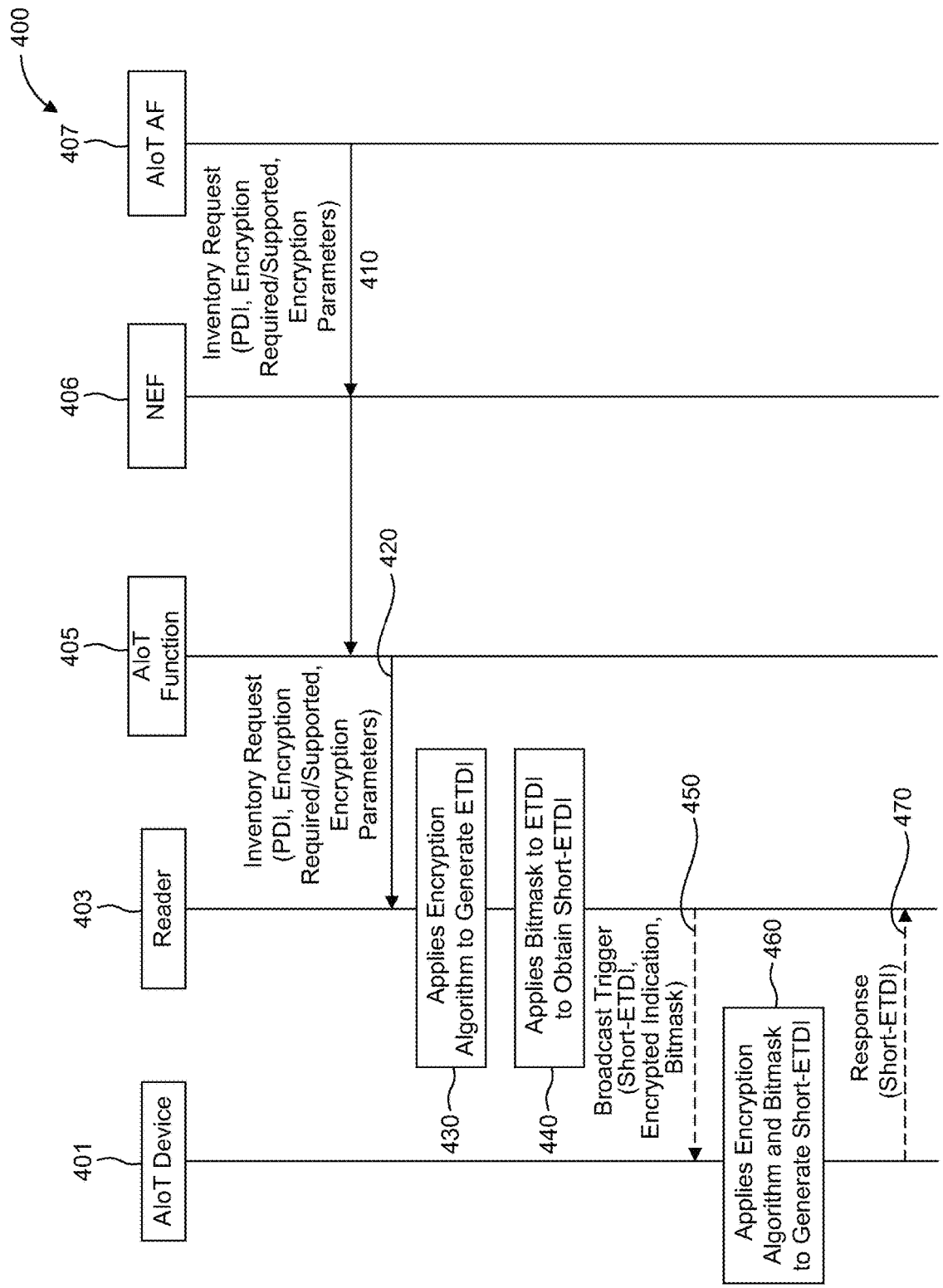
FIG. 4 is a signaling diagram illustrating an example of a reader generating a short-encrypted temporary device identifier (ETDI) for communicating with an AIoT device.

FIG. 4 is a signaling diagram illustrating an example of a reader generating a short-ETDI for communicating with an AIoT device. As shown in an example in signaling diagram 400, an AIoT AF 407 may send an request 410 to the 5GC. In an example, the request 410 may be an inventory request. Additionally or alternatively, the request 410 may be a communication request. The request 410 may include a target device PDI, an indication that an encrypted temporary identifier is supported by the device, and parameters related to the encryption method. The request 410 may also include the application identifier and a transaction number that identifies the request 410. Additionally or alternatively, the request 410 may include an indication that encryption is required. For example, the request 410 may include an indication that an encrypted temporary identifier is required. The request 410 may be received by NEF 406, and may be forwarded by the NEF 406 to the AIoT function 405.

Then, the AIoT function 405 may forward the inventory request 420 to a reader 403 that can communicate with AIoT device 401. In an example, the reader 403 may be a WTRU reader. Additionally or alternatively, the reader 403 may be a RAN node reader, such as a base station reader. The request 420 may include the same or similar information as request 410. For example, the request 420 may include the target device PDI, the indication that an encrypted temporary identifier is supported by the device, and the parameters related to the encryption method. The request 420 may also include the application identifier and a transaction number that identifies the request 420, in an example. Additionally or alternatively, the request 420 may include an indication that encryption is required. For example, the request 420 may include an indication that an encrypted temporary identifier is required.

The reader 403 may apply an encryption algorithm to generate the ETDI 430. As part of this step, the reader 403 may select a random value, and both the random value and the device PDI may be inputs to the calculation that determines the ETDI.

Further, if the size of the generated ETDI is not supported by the radio interface, the reader 403 may choose a bitmask and apply it to the ETDI to generate a short-ETDI that can fit the radio interface message 440. The reader 403 may store the PDI, bitmask, generated ETDI or short-ETDI along with the request information, such as, the application identifier and transaction number that identifies the request, in a local context.

Also, the reader 403 may broadcast a trigger message 450 over the radio interface and include the short-ETDI and the random value in the trigger message. The reader 403 may also broadcast 450 an indication that the identifier is encrypted, the identifiers of the encryption algorithm used, and the bitmask to shorten the temporary identifier while preserving the uniqueness or rareness of the resulting temporary identifier.

In addition, the AIoT device 401 may detect and decode the trigger message 450. The AIoT device 401 may then apply 460 the encryption algorithm to its stored PDI to generate ETDI, and then apply the received bitmask and use the received random value to obtain the short-ETDI. Further, the reader 403 may compare the result with the received short-ETDI. If the result matches the received short-ETDI, the AIoT device 401 recognizes that the broadcast trigger has targeted the AIoT device 401. Accordingly, the AIoT device 401 will initiate a response. Otherwise, the AIoT device 401 may ignore the trigger message.

Moreover, the AIoT device 401 may initiate the random access procedure in response to receiving the trigger message 450. Accordingly, the AIoT device 401 may includes the short-ETDI in a RA response message 470, transmitted to the reader 403.

Additionally or alternatively, the AIoT device 401 may include the ETDI of the AIoT device 401 when it initiates the random access procedure. In other words, the AIoT device 401 may receive the short-ETDI and respond with the ETDI. The advantage of this approach is the AIoT device 401 would receive a shortened value. Responding with the ETDI, in other words, the longer value, would account for a scenario where multiple short-ETDIs map to the same ETDI. In other words, multiple devices may respond to the same short-ETDI but each would respond with a different ETDI.

Figure 5:
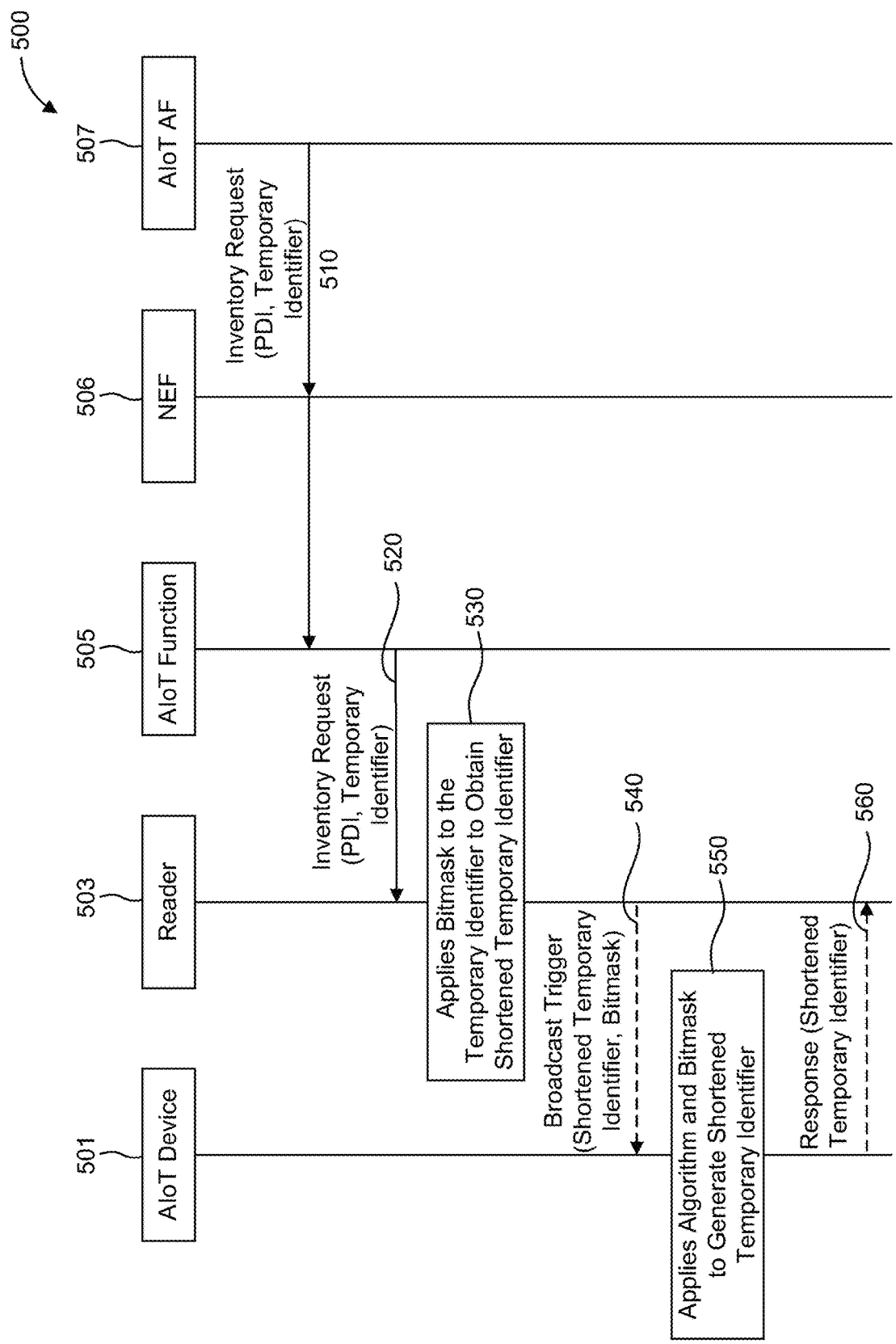
FIG. 5 is a signaling diagram illustrating an example of an application server (AS) generating a shortened temporary identifier for communicating with an AIoT device.

FIG. 5 is a signaling diagram illustrating an example of an AS generating a shortened temporary identifier for communicating with an AIoT device. As shown in an example in signaling diagram 500, a shortened AS-generated temporary identifier may be used by a reader, such as reader 503. For example, AIoT AF 507 may send a request 510, such as an inventory request, to the 5GC. Additionally or alternatively, the request may be a communication request. The request 510 may include a target device PDI and the AS-generated temporary identifier. The request 510 may also include an application identifier and a transaction number that identifies the request 510. In an example, the AS and an AIoT device 501 may support the same algorithm to generate a temporary identifier. The request 510 may be received by NEF 506, and may be forwarded by the NEF 506 to the AIoT function 505.

Subsequently, the AIoT function 505 may forward the request 520 to a reader 503 that is able to communicate with the AIoT device 501. In an example, the reader 503 may be a WTRU reader. Additionally or alternatively, the reader 503 may be a RAN node reader, such as a base station reader. The request 520 may include the same or similar information as request 510. For example, the request 520 may include the target device PDI and the AS-generated temporary identifier.

If the size of the AS-generated temporary identifier is not supported by the radio interface, the reader 503 may choose a bitmask and apply it to the AS-generated temporary identifier to obtain a shortened AS-generated temporary identifier 530. The reader 503 may store the PDI, bitmask and generated temporary identifier along with the request information, such as, the application identifier and transaction number that identifies the request, in the local context.

The reader 503 may broadcast a trigger message 540 over the radio interface and include the shortened AS-generated temporary identifier in the trigger message. Additionally or alternatively, the broadcast trigger message 540 may include the bitmask.

Further, the AIoT device 501 may detect and decode the trigger message. The AIoT device 501 may execute or apply the same algorithm as the AS to generate the temporary identifier from its stored PDI and apply the received bitmask to the generated temporary identifier to obtain or generate the shortened temporary identifier 550. If the result matches the received shortened AS-generated temporary identifier, the AIoT device 501 recognizes that the broadcast trigger has targeted the AIoT device 501 and may initiate a response. Otherwise, the AIoT device 501 may ignore the trigger.

The algorithm may be based on a standardized function. The PDI and a seed value may be used as inputs, for example, arguments, to such a function. The AIoT device 501 may receive the seed value from the reader 503 in the received broadcast trigger 540, or the seed value may be a configurable value that is written in the AIoT device 501 via a write operation.

Moreover, the AIoT device 501 may initiate the RA procedure with an RA message as a response 560 and include the shortened temporary identifier in the RA message. The reader 503 may receive the response 560, including the shortened temporary identifier.

If the reader has chosen a certain type of device identifier to communicate with the target AIoT device but failed to receive a response from the AIoT device, the reader may switch to another type of device identifier. For example, the reader may have initially chosen a short-EDTI to be sent in the broadcast trigger and failed to receive the response.

Figure 6:
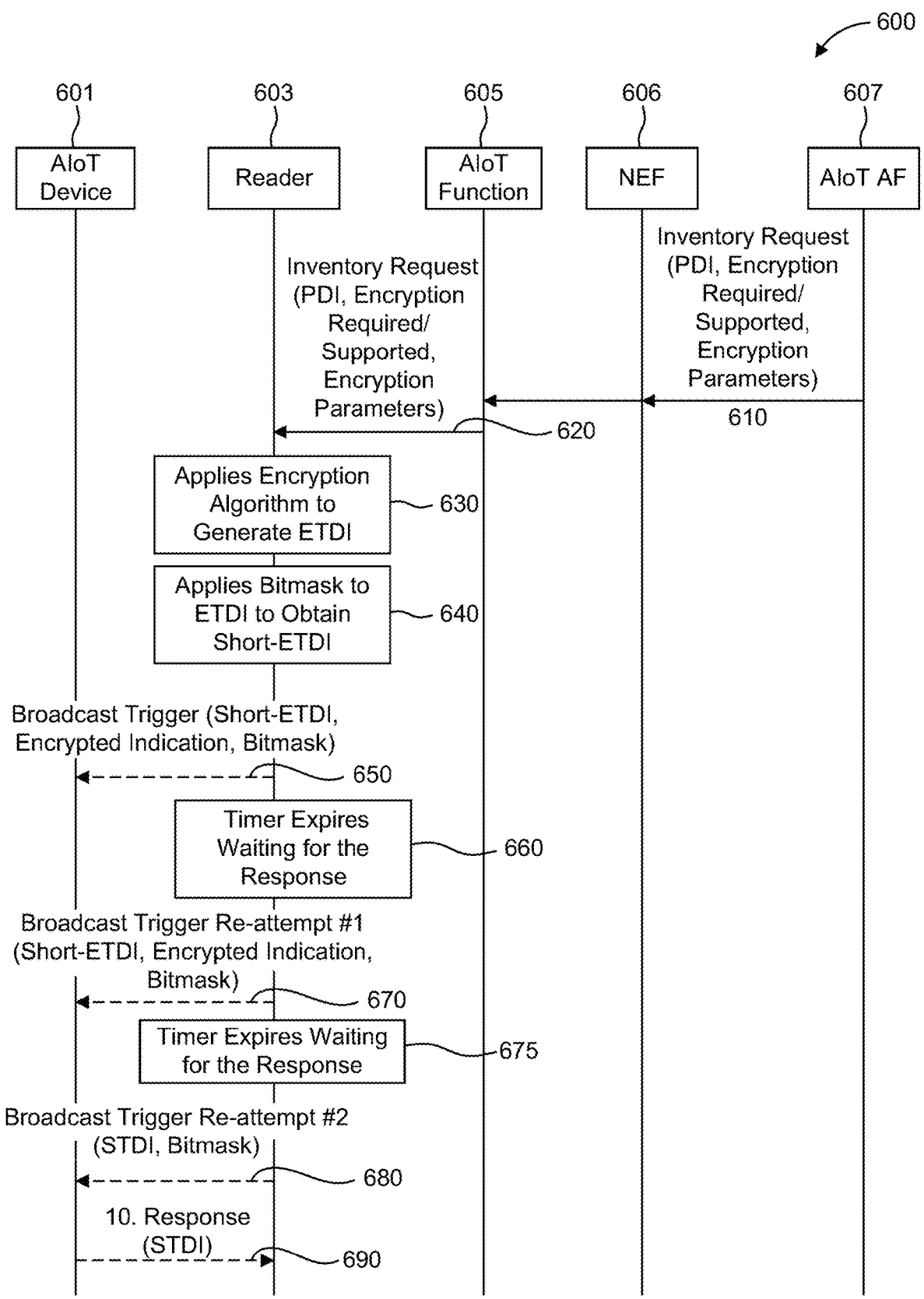
FIG. 6 is a signaling diagram illustrating an example of a reader reattempting to reach an AIoT device using another type of device identifier.

FIG. 6 is a signaling diagram illustrating an example of a reader reattempting to reach an AIoT device using another type of device identifier. As shown in signaling diagram 600, after a configured number of re-attempts, a reader 603 may choose to use a PDI or STDI in the broadcast trigger message.

For example, an AIoT AF 607 may send an inventory request 610 to the 5GC. The request 610 may include a target device PDI, an indication that an encrypted temporary identifier is supported by the device, and parameters related to the encryption method. The request 610 may also include the application identifier and a transaction number that identifies the request 610. Additionally or alternatively, the request 610 may include an indication that encryption is required. For example, the request 610 may include an indication that an encrypted temporary identifier is required.

The request 610 may be received by NEF 606, and may be forwarded by the NEF 606 to the AIoT function 605.

Then, the AIoT function 605 may forward the inventory request 620 to a reader 603 that can communicate with AIoT device 601. In an example, the reader 603 may be a WTRU reader. Additionally or alternatively, the reader 603 may be a RAN node reader, such as a base station reader. The request 620 may include the same or similar information as request 610. For example, the request 620 may include the target device PDI, the indication that an encrypted temporary identifier is supported by the device, and the parameters related to the encryption method. The request 620 may also include the application identifier and a transaction number that identifies the request 620, in an example. Additionally or alternatively, the request 620 may include an indication that encryption is required. For example, the request 620 may include an indication that an encrypted temporary identifier is required. The reader 603 may receive the request 620.

The reader 603 may then apply an encryption algorithm to generate an ETDI 630. As part of this step, the reader 603 may select a random value, and both the random value and the device PDI may be inputs to the calculation that determines the ETDI.

Further, if the size of the generated ETDI is not supported by the radio interface, the reader 603 may choose a bitmask and apply it to the ETDI to generate a short-ETDI that can fit the radio interface message 640. The reader 603 may store the PDI, bitmask, generated ETDI or short-ETDI along with the request information, such as, the application identifier and transaction number that identifies the request, in a local context.

Also, the reader 603 may broadcast a trigger message 650 over the radio interface and include the short-ETDI and the random value in the trigger message. The reader 603 may also broadcast 650 an indication that the identifier is encrypted, the identifiers of the used encryption algorithm, and the bitmask to shorten the temporary identifier while preserving the uniqueness or rareness of the resulting temporary identifier. In this way, the reader 603 tries to reach the AIoT device 601 using the short-ETDI.

In addition, the AIoT device 601 may attempt to detect and decode the trigger message 650. In an example, the AIoT device 601 may fail to detect the trigger message 650. In another example, AIoT device 601 may fail to decode the trigger message 650. Additionally or alternatively, the trigger message 650 may not reach the AIoT device 601 due to interference. Accordingly, the reader 603 may then fail to receive the response after a configured timer period. For example, a timer or a counter may expire 660 while waiting for the response 650.

Upon a determination that a certain amount of time has elapsed 660, the reader 603 re-attempts to reach the AIoT device 601 using a short-ETDI 670. In an example, this may be a first broadcast trigger re-attempt 670. The broadcast trigger re-attempt 670 may include an indication that the identifier is encrypted, the identifiers of the used encryption algorithm, and the bitmask to shorten the temporary identifier.

Further, the AIoT device 601 may attempt to detect and decode the broadcast trigger re-attempt 670. The reader 603 may then fail to receive the response, such as broadcast trigger re-attempt 670, after a configured timer period. For example, a timer or a counter may expire while waiting 675 for the response 670.

Upon a determination that a certain amount of time has elapsed 675, the reader 603 again re-attempts to reach the AIoT device 601 using an STDI 680, instead of the short-ETDI. In an example, this may be a second broadcast trigger re-attempt 680. The broadcast trigger re-attempt 680 may include an indication that the identifier is encrypted, the identifiers of the used encryption algorithm, and the bitmask to shorten the temporary identifier.

Moreover, the AIoT device 601 may attempt to detect and decode the broadcast trigger re-attempt 680, and may be successful in doing so. The AIoT device 601 may then send a response including the STDI 690 to the reader 603. The reader 603 may successfully receive the response 690 from the AIoT device 601.

In an example, a reader device may receive a request including a PDI for an AIoT device. In an example, the request may be an inventory request. Additionally or alternatively, the request may be a communication request. The reader device may generate an ETDI based on application of an encryption algorithm to the PDI. Further, the reader device may obtain a short-ETDI based on application of a bitmask to the ETDI. Also, the reader device may transmit, over a radio interface, a trigger message including the short-ETDI to the AIoT device. Moreover, the reader device may receive, over the radio interface, an RA response message including the short-ETDI from the AIoT device. In an example, the request is received from an AIoT function.

Further, the request may include an indication that encryption is supported by the AIoT device. Moreover, generating the ETDI may be further based on the indication that encryption is supported by the AIoT device. Additionally or alternatively, obtaining the short-ETDI is further based on a determination that the PDI is longer than a maximum message size supported by the radio interface, that the ETDI is longer than the maximum message size supported by the radio interface and that the short-ETDI is shorter than or the same length as the maximum message size supported by the radio interface.

Additionally or alternatively, the reader device may be a wireless transmit/receive unit (WTRU) reader device. Additionally or alternatively, the reader device may be a base station reader device. Additionally or alternatively, the request may include an indication of encryption parameters, and generating the ETDI may be further based on the indication of encryption parameters. Additionally or alternatively, generating the ETDI may be further based a selected random value. Additionally or alternatively, the request may include an application identifier. Additionally or alternatively, the trigger message may further include the bitmask. Additionally or alternatively, the trigger message may further include an algorithm to obtain the short-ETDI.

Examples provided herein include identifying an AIoT device or application based on a received device identifier. As shown in procedure provided above, when an AIoT device detects and decodes a broadcast trigger message, the AIoT device may initiate a response procedure, such as a Random Access procedure. The AIoT device may also include a device identifier in a response message of the AIoT device. The device identifier in the response message may be the same as the one received in the broadcast trigger message.

However, sometimes the device identifier in the response message may be different from that received in the broadcast trigger message. For example, the reader may have used the PDI in the broadcast trigger message, and the device may use an STDI or short-ETDI in the response message, for preserving privacy, or for the reason that the UL channel does not support the full size of the PDI. For another example, the reader may have used the group identifier in the broadcast trigger message to address a group of one or more AIoT devices, and each device associated with the group may respond with its individual device identifier, for example, an STDI or short-ETDI.

When the device identifier in the response message is identical to that in a previous trigger message sent over the air interface, the reader is able to match the device identifier with the trigger message and the request that has caused the trigger message. In addition, the reader is able to construct a report, for example, an inventory report, and send the report to the AIoT AS or AF.

When the temporary device identifier in the response message is different from that in a previous trigger message sent over the air interface, the reader may apply an AS-provided bitmask to the received temporary device identifier. The result of the bitmask operation may be used to identify the AIoT application that the AIoT device is associated with. Thus, the reader is able to construct a report, for example, an inventory report, and send the report to the AIoT AS or AF. In this case, the reader may send both the PDI and the received temporary device identifier to the AS so the AS, and can further verify if they point to the same device.

Figure 7:
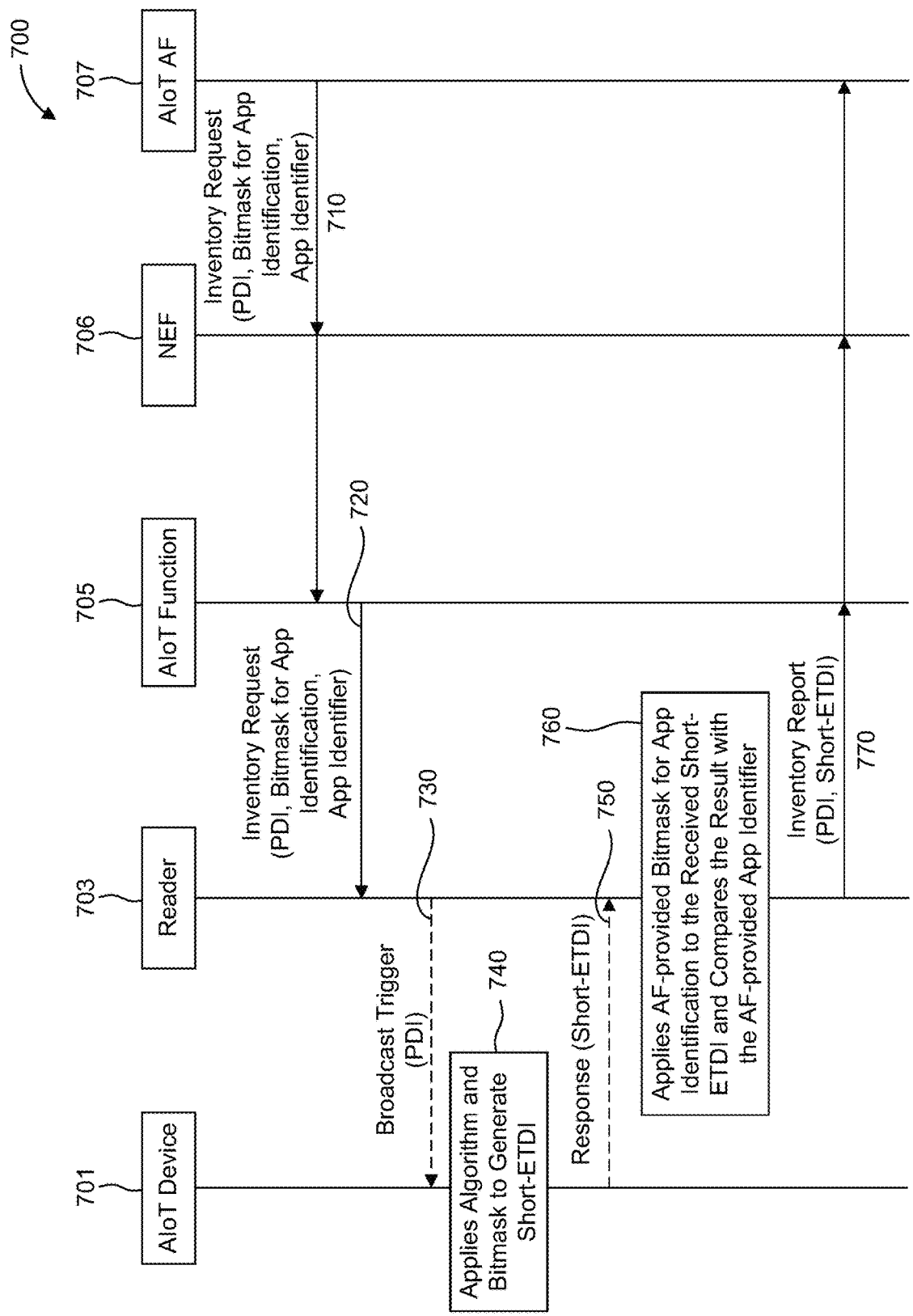
FIG. 7 is a signaling diagram illustrating an example of an AIoT application identification based on a received temporary identifier.

FIG. 7 is a signaling diagram illustrating an example of an AIoT application identification based on a received temporary identifier. As shown in an example in signaling diagram 700, an AIoT AF 707 may send an inventory request 710 to the 5GC. The request 710 may include a target device PDI, a bitmask for App Identification and an App identifier. In an example, the AS and the device support the same algorithm to generate a temporary identifier. In addition, the generated temporary identifier may include an App Identifier as part of the temporary identifier.

The inventory request 710 may be received by NEF 706, and may be forwarded by the NEF 706 to an AIoT function 705. Then, the AIoT function 705 may forward the inventory request 720 to a reader 703 that can communicate with AIoT device 701. In an example, the reader 703 may be a WTRU reader. Additionally or alternatively, the reader 703 may be a RAN node reader, such as a base station reader. The request 720 may include the same or similar information as request 710. For example, the request 720 may include the target device PDI, the bitmask for App Identification and the App identifier.

Further, the reader 703 may broadcast a trigger message 730 over the radio interface and include the PDI in the trigger message. Also, the AIoT device 701 may receive trigger message 730 over the radio interface.

In addition, the AIoT device 701 may generate a short-ETDI 740. In an example, the AIoT device 701 may apply an algorithm and bitmask to generate the short-ETDI. The algorithm may be the same algorithm used by the AS. Further, the bitmask may be the bitmask for App Identification, or may be similar to that bitmask.

In an example, the AIoT device 701 may generate and use the short-ETDI 740 instead of the PDI in order to preserve or enhance privacy or security. Additionally or alternatively, the AIoT device 701 may generate and use the short-ETDI 740 instead of the PDI because the UL channel does not support the full size of the PDI. In an example, the UL channel may have less capacity than the DL channel.

Further, the AIoT device 701 may send a response message 750 to the reader 703 and include the short-ETDI in the response message. The response message 750 may be received by the reader 703.

Also, the reader 703 may apply a bitmask operation 760 to the received short-ETDI using the AF-provided bitmask for application identification and compare the result with the AF-provided application identifier. If the result matches the AF-provided application identifier, the reader 703 is able to associate the response with the previous request and send an inventory report 770 to the AIoT AF 707. The inventory report 770 may contain both the PDI and the received short-ETDI, or may contain one or the other.

The reader 703 may send the inventory report 770 to the AIoT AF 707 by sending the inventory report 770 to AIoT Function 705. Then, AIoT 705 may forward the inventory report 770 to the NEF 706. In turn, the NEF 706 may forward the inventory report 770 to the AIoT AF 707.

Examples are provided herein of a reader-complemented inventor report. A reader may be pre-configured with the expected content and format of an inventory report by a specific AIoT application. For example, for AIoT Application X, the expected inventory report may contain the following information.

The expected inventory report may contain a device identifier. For example, the expected inventory report may contain a permanent device identifier. In another example, expected inventory report may contain a temporary device identifier.

Further, the expected inventory report may contain timestamp information. For example, the expected inventory report may contain the time that the reader sent the trigger message, the time the reader received the device response, or both times.

Also, the expected inventory report may contain reader identifier information. For example, the expected inventory report may contain the general public subscription identifier (GPSI) of the WTRU reader. In another example, the expected inventory report may contain the cell global identity (CGI) of the RAN node reader.

Moreover, the expected inventory report may contain reader location information. For example, the expected inventory report may contain GPS coordinates for the reader, a PLMN identifier, a cell identifier, and the like.

A reader may also receive such a configuration during the reader registration or authorization procedure, or along with the inventory request received from the AIoT-AS/AF. The reader may be pre-configured with the expected content and format of an inventory report by way of configuration information.

Figure 8:
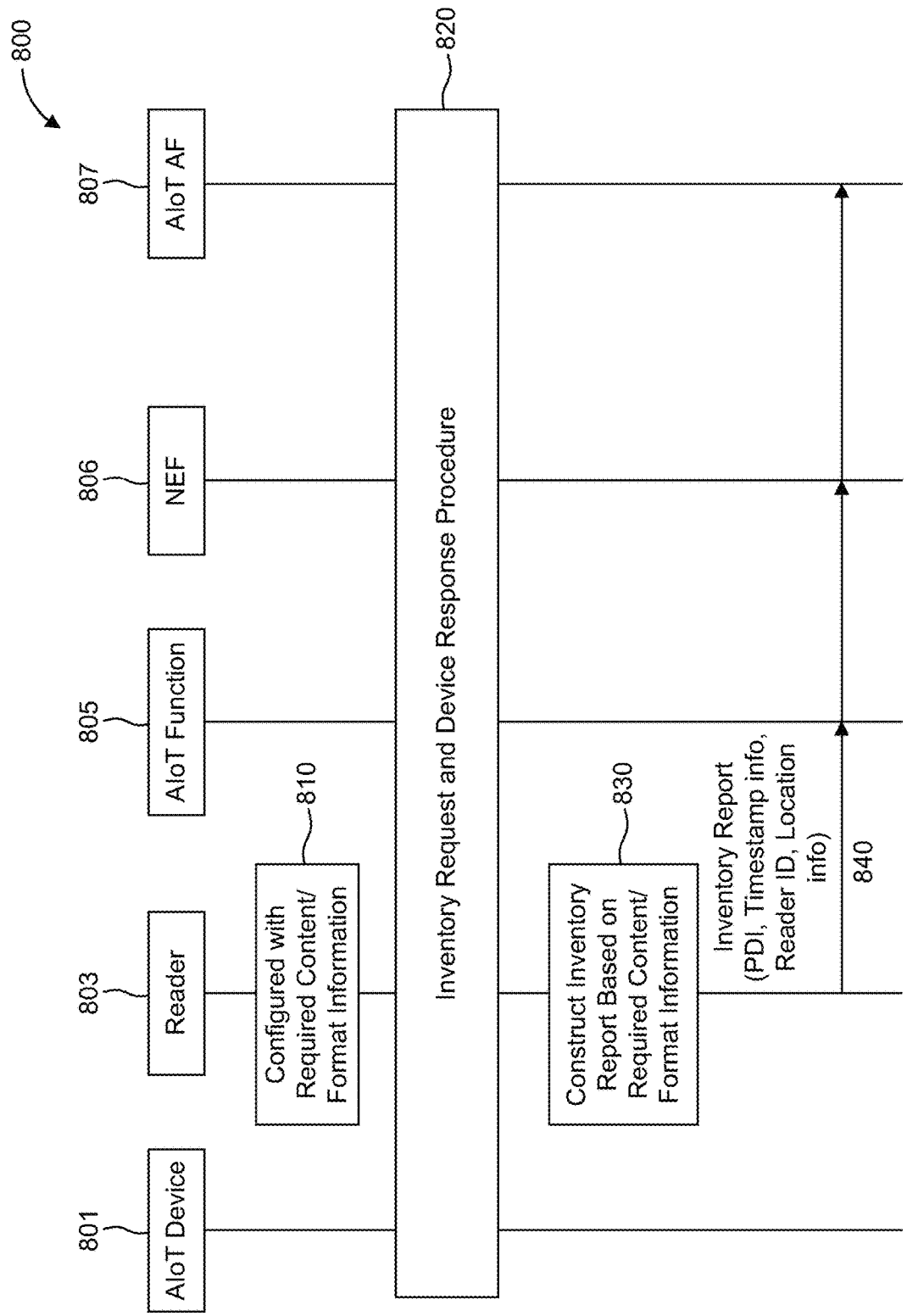
FIG. 8 is a signaling diagram illustrating an example of a procedure using a reader-complemented inventory report.

FIG. 8 is a signaling diagram illustrating an example of a procedure using a reader-complemented inventory report. As shown in an example in signaling diagram 800, a reader 803 may be configured 810 with required content information for an inventory report, required format information for an inventory report, or both. When the reader 803 receivers an AIoT device 801 response over the radio interface, as described in the inventory request and device response procedure 820 provided in one or more examples in FIGS. 2-7 and related text, the reader 803 decodes the response message. Further, the reader 803 may send a report, for example, an inventory report, to the AIoT-AS/AF.

If there is no content configuration or format configuration available at the reader 803, the reader 803 may simply include the device identifier in the report and send it to the AIoT-AS/AF. If the temporary device identifier was used for the broadcast trigger message and device response message, the reader 803 may obtain the PDI according to the received temporary identifier by checking the stored information in the local context.

If there is content configuration, format configuration, or both available, in addition to device identifier information, the reader 803 may construct an inventory report 830 with required content, for example, timestamp information, a reader identifier and location information, and the like. The reader 803 may construct the inventory report 830 based on required content configuration, format configuration, or both. The reader 803 may also append any additional information received in the device response message, for example, device status information, in the report. The reader 803 then sends the reader-complemented report to the AIoT-AS/AF. For example, reader 803 then sends the inventory report 840 to the AIoT function 805. The inventory report 840 may include one or more of a PDI, timestamp information, a reader ID and location information. Further the AIoT function 805 may forward the inventory report to an NEF 806. Likewise, the NEF 806 may forward the inventory report to an AIoT AF 807.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable dieks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a reader device, the method comprising:
    receiving a request including a permanent device identifier (PDI) for an ambient-power-enabled internet of things (AIoT) device;
    generating an encrypted temporary device identifier (ETDI) based on application of an encryption algorithm to the PDI;
    obtaining a short-ETDI based on application of a bitmask to the ETDI;
    transmitting, over a radio interface, a trigger message including the short-ETDI to the AIoT device; and
    receiving, over the radio interface, a random access (RA) response message including the short-ETDI from the AIoT device.

2. The method of claim 1, wherein the request is an inventory request and the inventory request is received from an AIoT function.

3. The method of claim 1, wherein the request includes an indication that encryption is supported by the AIoT device, and wherein generating the ETDI is further based on the indication that encryption is supported by the AIoT device.

4. The method of claim 1, wherein obtaining the short-ETDI is further based on a determination that the PDI is longer than a maximum message size supported by the radio interface, that the ETDI is longer than the maximum message size supported by the radio interface and that the short-ETDI is shorter than or the same length as the maximum message size supported by the radio interface.

5. The method of claim 1, wherein the reader device is a wireless transmit/receive unit (WTRU) reader device.

6. The method of claim 1, wherein the reader device is a base station reader device.

7. The method of claim 1, wherein the request includes an indication of encryption parameters, and wherein generating the ETDI is further based on the indication of encryption parameters.

8. The method of claim 1, wherein generating the ETDI is further based a selected random value.

9. The method of claim 1, wherein the request includes an application identifier.

10. The method of claim 1, wherein the trigger message further includes at least one of the bitmask or an algorithm to obtain the short-ETDI.

11. A reader device comprising:
a transceiver; and
a processor operatively coupled to the transceiver; wherein;
the transceiver and processor are configured to receive a request including a permanent device identifier (PDI) for an ambient-power-enabled internet of things (AIoT) device;
the processor is configured to generate an encrypted temporary device identifier (ETDI) based on application of an encryption algorithm to the PDI;
the processor is configured to obtain a short-ETDI based on application of a bitmask to the ETDI;
the transceiver and processor are configured to transmit, over a radio interface, a trigger message including the short-ETDI to the AIoT device; and
the transceiver and processor are configured to receive, over the radio interface, a random access (RA) response message including the short-ETDI from the AIoT device.

12. The reader device of claim 11, wherein the request is an inventory request and the inventory request is received from an AIoT function.

13. The reader device of claim 11, wherein the request includes an indication that encryption is supported by the AIoT device, and wherein generating the ETDI is further based on the indication that encryption is supported by the AIoT device.

14. The reader device of claim 11, wherein obtaining the short-ETDI is further based on a determination that the PDI is longer than a maximum message size supported by the radio interface, that the ETDI is longer than the maximum message size supported by the radio interface and that the short-ETDI is shorter than or the same length as the maximum message size supported by the radio interface.

15. The reader device of claim 11, wherein the reader device is a wireless transmit/receive unit (WTRU) reader device.

16. The reader device of claim 11, wherein the reader device is a base station reader device.

17. The reader device of claim 11, wherein the request includes an indication of encryption parameters, and wherein generating the ETDI is further based on the indication of encryption parameters.

18. The reader device of claim 11, wherein generating the ETDI is further based a selected random value.

19. The reader device of claim 11, wherein the request includes an application identifier.

20. The reader device of claim 11, wherein the trigger message further includes at least one of the bitmask or an algorithm to obtain the short-ETDI.

* * * * *